UNITED STATES PATENT OFFICE.

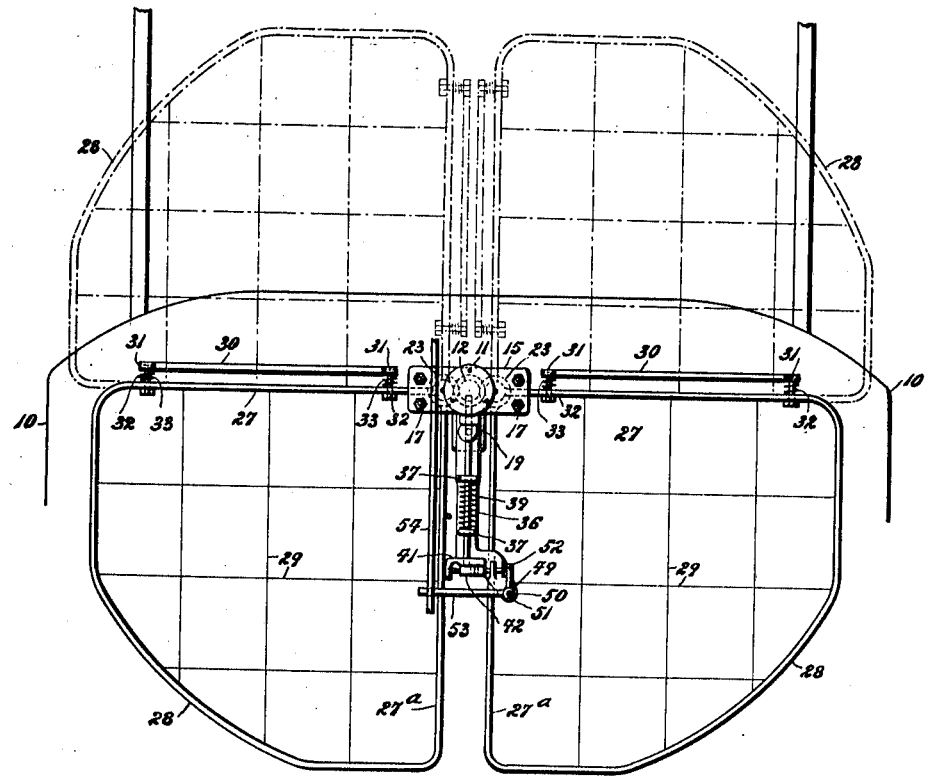
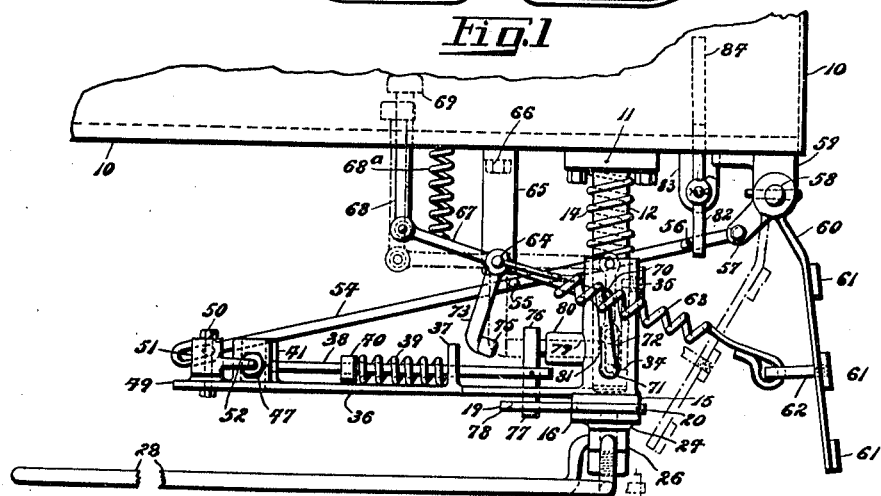

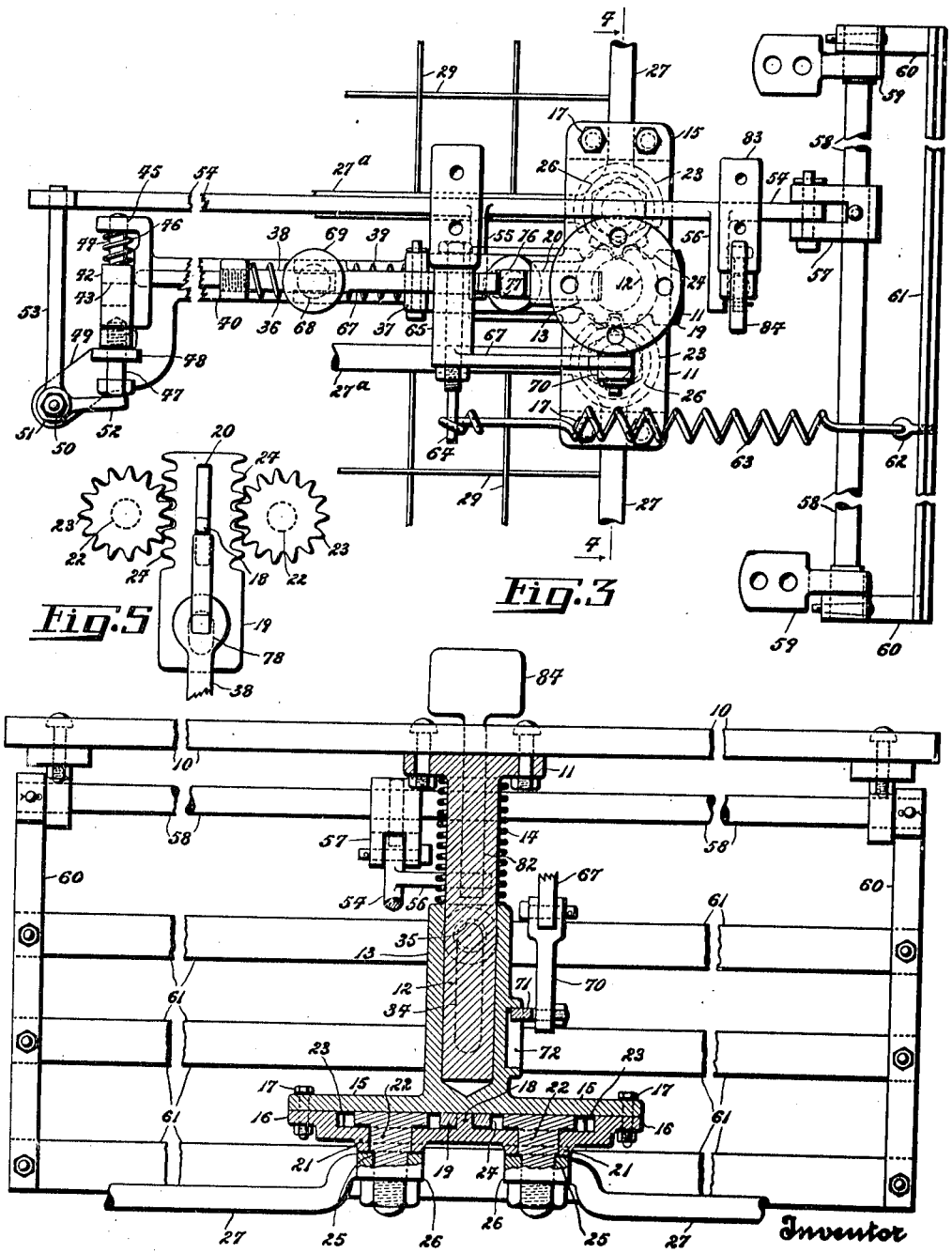

WILLIAM McCONNELL, OF PHILADELPHIA, PENNSYLVANIA.

VEHICLE-FENDER.

1,317,087.　　　　　　　Specification of Letters Patent.　　Patented Sept. 23, 1919.

Application filed February 4, 1919.　Serial No. 274,906.

*To all whom it may concern:*

Be it known that I, WILLIAM McCONNELL, a subject of the King of England, residing at Philadelphia, in the county of Philadelphia and State of Pennsylvania, have invented new and useful Improvements in Vehicle-Fenders, of which the following is a specification.

This invention relates to vehicle fenders and it has more general reference to fenders such as are usually employed on street cars and similar vehicles to prevent the wheels thereof from passing over any obstruction accidentally or otherwise located in the path of such vehicle when moving.

The invention has particular reference to that type of fender which includes a plurality of swinging frames conveniently mounted beneath the forward body portion of the car, said frames being adapted to normally repose beneath the car when not in use but arranged for rapid movement to a protective position in front of the car when desired or when an accident is imminent.

The main object of this invention is to provide a vehicle fender of the type referred to which will be automatically actuated, should the operator of the vehicle on which it is installed, not notice an obstruction in the path of the car in time to operate the fender manually.

A further object of this invention is to provide a vehicle fender of the type referred to which is furnished with a buffer device or devices which minimize the chances of serious injury to the person or object struck thereby.

A still further object of the invention resides in the provision of a vehicle fender which when moved into the protective position, can be conveniently returned to the out-of-the-way position by the operator of the car simply pressing down on the pedal in the car.

With the foregoing and other objects in view, the invention consists essentially in the novel features of construction, combination and arrangement of the several parts hereinafter fully described, illustrated by the accompanying sheets of explanatory drawings, and more specifically pointed out by the appended claims.

In describing the invention in detail, reference will be had to the accompanying drawings forming a part of this specification, wherein like characters denote the same or corresponding parts in all the views; and in which—

Figure 1—is a plan view showing the application of my invention to an ordinary street car; the full lines denoting the position occupied normally by the fender when not in use, and the dot-and-dash lines indicating the position when the fender is moved into operative position to avert an accident or minimize a collision.

Fig. 2—is a fragmentary side view of the same drawn to an enlarged scale for the sake of clearness.

Fig. 3—is a still further enlarged plan view of the fender and its operating mechanism.

Fig. 4—is a vertical section on the line 4—4 in Fig. 3, and looking in the direction of the arrows.

Fig. 5—is a detail plan view of the fender operating rack and pinion movement.

Referring more particularly to the views the outline forward end of a street car is designated by the numeral 10, to the underside of which is secured a bracket 11, provided with a vertically depending shaft 12, housed in a slidable sleeve 13, under the action of a strong compression spring 14. This sleeve 13, is formed at its lower part with laterally projecting arms 15, to which is secured a bridge section 16, by means of bolts 17, and centrally of said bridge section there is formed a vertical projection or rib 18, on which is adapted to slide a rack bar 19, provided with a longitudinally extending slot 20. Journaled in vertically depending bearings 21, on the bridge section 16, are stub axles 22, having at their upper extremities integrally formed pinions 23, lying between the arms 15, and the section 16, and meshing with the toothed edges 24, of the aforesaid rack bar 19. The stub axles 22, are reduced or shouldered at 25, and have securely bolted thereon, bosses 26, integral with the frame members 27, 27—a, of fenders 28, a pair of which are employed as will be readily seen on an examination of the drawings. The fenders 28, are preferably provided with yieldable surfaces consisting of interlaced cross-wires 29, and the frame members 27,—Fig. 1—are fitted with buffer elements including bars 30, connected at their ends into the heads 31, of slidable bolts 32, encircled by compression springs 33. Thus it will be readily seen that the bars 30, will serve the dual functions of reducing the impact when the fenders 28, strike an object and throw it over or down upon the yieldable surfaces thereof, as well as minimizing the shock when the two fenders are swung toward one another as shown by the dot-and-dash lines which indicate the operative position in the above referred to figure. In order to prevent the slidable sleeve 13, from turning axially, I form a vertical groove 34, in the shaft 12, into which projects the end of a stud 35, which is threaded into said sleeve 13, and serves to limit the vertical movements thereof. Projecting rearwardly from the slidable sleeve 13, is a horizontally disposed arm 36, formed with an upstanding bracket 37, constituting a journal for a slidable rod 38, under the action of a spiral spring 39, and adapted for adjustment by means of a threaded collar or nut 40, and said rod 38, is extended rearwardly to form a latch, for which purpose it has sliding engagement in a bracket 41. At right angles to the rod 38, and in sliding engagement with the bracket 41, I arrange a block 42, provided with a hole 43, into which the end of the rod 38, is adapted to be projected by the action of the spring 39, as hereinafter explained, and said block is provided with a trunnion 44, housed in the bracket 41, at 45, and the trunnion is encircled by a compression spring 46. Axially opposed to the trunnion 44, I thread a stud 47, into the block 42, and said stud is slidably housed in the bracket 41, at 48. Extending laterally from the arm 36, beyond the bracket 41, is an arm 49, on which is hingedly mounted by a bolt or stud 50, a crank lever 51, one arm 52, of which contacts with the head of the stud 47, and the other arm 53, extends laterally at right angles to the arm 36, into the slotted end of a connecting rod 54, provided with projecting arms 55, 56,—the purpose whereof will be later on explained—and at its forward end it is hingedly joined to a forked lever 57, depending from and secured to a transverse rock shaft 58, mounted in bearings 59, securely bolted beneath the forward end of the car 10. Depending from the rock shaft 58, is a guard, for actuating the fenders 28, in the event of anything being in the path of the car and not seen by the operator as well as preventing anything falling upon the yieldable surfaces of the fender proper from rolling beneath the car, and said guard conveniently includes side members 60, and horizontal members 61, to one of the latter of which is connected by an eye bolt 62, one end of a tension spring 63, the other end whereof is hingedly attached to a protruding end of a horizontal shaft or bolt 64. said spring 63, serving to render the guard 60, 61, sensitive to the least impact with an obstruction, as well as controlling the degree of force necessary to effect the release of the locking and rack operating mechanism.

This shaft or bolt 64 is mounted in a bracket 65, securely attached to the underside of the car 10, by bolts 66, and it serves as a bearing for a rock lever 67, having hinge connection at its rear end to a vertical rod 68, under the action of a spring $68^a$, and provided with a pedal head 69, and at its forward end the lever 67, has hingedly connected thereto a depending link bar 70, provided at its lower end with a laterally projecting element 71. This element 71, extends into a vertical slot or groove 72, formed for its reception in the above described sleeve 13. Depending from rock lever 67, is an integral angled lever 73, the lower end whereof is enlarged at 75, to engage the squared head 76 of a vertical pin 77, secured in the forward end of the slidable rod 38, and the lower end of this pin 77, extends downwardly into a second longitudinal slot 78, formed in the aforesaid rack bar 19. Projecting longitudinally from the squared head 76, is a latch pin 79, having sliding engagement in a boss 80, on the sleeve 13, and it is to be noted that when the several parts are in the positions shown by the full lines on the drawings this latch pin projects into a hole 81, provided for its reception in the depending shaft 12, whereby the fender is locked in its inoperative position.

Referring now to the projecting arms 55, 56, it will be seen that the former 55, extends into the path of and engages with the angled lever 73, whereas the latter engages the lower end of a pedal lever 82, pivoted to a bracket 83, beneath the car 10, and said lever 82 is extended upward into the car vestibule where it is provided with a pedal 84, by means of which the operator of the car may throw the entire device into protective position.

Having thus far described the several parts in detail that constitute the improved vehicle fender and assuming that the operator of the car 10, notices a danger condition confronting the car, he immediately forces or kicks the pedal 84, forward, which releases the entire mechanism by the action of the lever 82, and arm 56, and permits the fenders 28 to assume protective position.

On the other hand my invention being primarily devised to insure automatic action in any event, that is to say, more specifically when the car operator may not see imminent danger and release the mechanism as described, instantly the person or obstruction is hit by the guard 60, 61, the connecting rod 54, is moved rearwardly which results in the rocking of the crank lever 51, to the left-hand in Fig. 3, which moves the block 42, on its trunnion 44, and brings the hole 43 therein, into register with the end of the rod 38, whereupon said rod is rearwardly shot by the action of the spring 39, which withdraws the latch pin 79. Immediately with the withdrawal of the latch pin 79, the spring 14, projects the sleeve 13, downwardly until the fenders 28, are in juxtaposition to the track, said movement taking place before the rack bar 19, has turned the pinions 22, 23, about their axes, through a quarter turn to oscillate the fenders 28, into the position shown by the dot-and-dash lines on Fig. 1, and in order to insure this preliminary movement of the sleeve 13, downward, the slot 78, in the rack bar 19, is somewhat extended longitudinally so that the pin 77, has an initial rearward travel before engaging said rack bar. At the same time the rock shaft 58 has been moved partially around its axis and the fender guard 60, 61, drawn under the action of the spring 63, to the position shown in dot-and-dash lines in Fig. 2, thereby preventing anything which has fallen onto the yieldable surfaces of the fenders 28, from rolling beneath the car 10. The oscillation of the fenders 28, into the forward or advanced position, takes place after the guard 60, 61, has been moved backward and said fenders lowered by the spring 14, close to the track, and it will be readily seen that when the buffer members 30 strike a person or other object, said person or object will not be materially damaged thereby and will be tipped down onto the yieldable surfaces of the fenders 28, in a practically unharmed condition, while the shock of the impact will have been reduced to a minimum. Further it will be noted that the person or object struck cannot roll beneath the car 10, due to the position and size of the guard 60, 61. When it is desired to return the parts to their normal position, the operator of the car presses down on the pedal head 69, which through the connections 67, 70, 71, raises the sleeve 13, till the latch pin 79, again enters the hole 81, due to the angle lever head 75, pressing thereagainst. At the same time the end of the rod 38, is withdrawn from engagement with the block 42, by means of the pin 77, and said block is moved out of axial alinement therewith, under the action of the spring 46, ready to lock the entire mechanism, and the connecting rod 54 is moved forwardly by the contact of the angle lever 73, with the projecting arm 55, while the pin 77, has operated the rack bar 19, which in turn has moved the fenders 28 into inoperative, or out-of-the-way position beneath the car 10, whereupon the spring 63 is again placed in tension.

From the foregoing description it will be seen that by the present invention there is provided an automatic vehicle fender which fulfils all of the objects hereinbefore set forth, while the fender is comparatively simple in construction, can be expeditiously and conveniently installed, and will not project beyond the front of the car when the latter is operating under normal conditions.

While I have particularly described one practical embodiment of the invention, I wish it clearly understood that various changes may be made in the form and general arrangement of the several parts, as well as other combinations adopted without departing from the essential features of said invention, and hence I do not limit myself to the precise details set forth, but consider myself at liberty to make such changes and other combinations as fairly fall within the spirit and scope of the appended claims.

Having described my invention, I claim,—

1. A vehicle fender comprising fender frames movably disposed beneath the vehicle and at a distance from the ground and means for moving said fender frames downwardly toward the ground and swinging the frames outwardly from beneath the vehicle to a protective position in front of the vehicle.

2. A vehicle fender comprising fender frames normally disposed beneath the vehicle and at a distance from the ground, means for moving said fender frames downwardly toward the ground and swinging the frames outwardly from beneath the vehicle to a protective position in front of the vehicle, and means for retracting said frames to a position beneath the vehicle and moving the frames upwardly during retraction to return them to their normal position beneath the vehicle.

3. A vehicle fender comprising fender frames normally disposed beneath the vehicle and a distance from the ground, spring influenced means including a movable bearing and a pin and slot mechanism for moving said fender frames downwardly toward the ground, rack and pinion mechanism for swinging the frames outwardly to a protective position in front of the vehicle, and means for retracting said frames to a position beneath the vehicle and moving the frames upwardly during retraction to return them to their normal position beneath the vehicle.

4. A vehicle fender comprising fender frames movably disposed beneath the vehicle and a distance from the ground, spring influenced means including a movable bearing with a pin and slot mechanism for controlling the movement of said bearing and carrying the fender frames downwardly toward the ground, rack and pinion mechanism for swinging the frames outwardly to a protective position in front of the vehicle, means for locking said frames in the protective position, and means for retracting said frames to a position beneath the vehicle and moving the frames upwardly during retraction to return them to their normal position beneath the vehicle.

5. A vehicle fender comprising fender frames normally disposed beneath the vehicle at a distance from the ground, spring influenced means including a movable bearing with a pin and slot mechanism for controlling and limiting the movement of the fenders downwardly toward the ground, spring influenced rack and pinion mechanism for swinging the frames downwardly to, and returning same from the protective position, a locking mechanism for normally holding the fender frames against swinging movement, means for releasing the locking mechanism, a latch mechanism for maintaining the movable bearing in elevated position said latch mechanism being operated in advance of the rack and pinion mechanism, and means for moving the frames upwardly during retraction to return them to their normal position beneath the vehicle.

6. A vehicle fender comprising fender frames normally disposed beneath the vehicle at a distance from the ground, a spring influenced movable bearing provided with a pin and slot mechanism for controlling and limiting the movement of the fenders downwardly toward the ground, spring influenced rack and pinion mechanism for swinging the frames outwardly to and retracting them from the protective position, and spring controlled locking mechanism for holding the fender frames against swinging movement, an oscillatable guard connected with said locking mechanism and adapted to release the same, a latch mechanism in connection with the locking mechanism and adapted for maintaining the movable bearing in elevated position, said latch mechanism being operated in advance of the rack and pinion mechanism, a foot operated spring influenced mechanism for moving the fender frames upwardly during retraction to return them to their normal position beneath the vehicle.

7. A vehicle fender comprising a vertically movable bearing supported beneath the vehicle, pinions mounted in said bearing and having depending therefrom a plurality of fender frames, a spring controlled slidable rack meshing with said pinions, a means for automatically operating said rack to effect the movement of the fender frames from the inoperative to the protective position, said means consisting of a swinging guard at the front of the vehicle.

8. A vehicle fender comprising a vertically movable spring influenced bearing supported beneath the vehicle, pinions mounted in said bearing and having depending axles supporting a plurality of fender frames, a spring controlled rack meshing with said pinions, means for normally locking the bearing in raised position, means for raising said bearing from its lowermost position, means for automatically operating the rack to effect the movement of the fender frames from the inoperative to the operative position and vice versa, and means for locking the fender in its inoperative position.

In testimony whereof I affix my signature.

WILLIAM McCONNELL.

Copies of this patent may be obtained for five cents each, by addressing the "Commissioner of Patents, Washington, D. C."